H. LESLEY.
DISCHARGE INDICATOR FOR STORAGE BATTERIES.
APPLICATION FILED DEC. 8, 1919. RENEWED MAR. 17, 1922.
1,415,101.
Patented May 9, 1922.
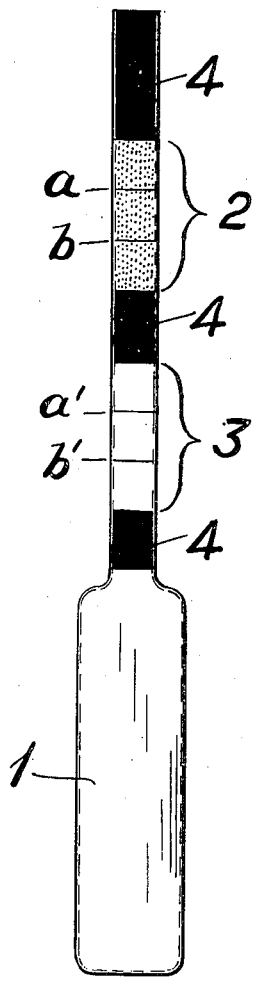
WITNESS:
INVENTOR
Hugh Lesley
BY
Augustus B. Stoughton
ATTORNEY.

UNITED STATES PATENT OFFICE.

HUGH LESLEY, OF PHILADELPHIA, PENNSYLVANIA.

DISCHARGE INDICATOR FOR STORAGE BATTERIES.

1,415,101.    Specification of Letters Patent.    Patented May 9, 1922.

Application filed December 8, 1919, Serial No. 343,384. Renewed March 17, 1922. Serial No. 544,689.

*To all whom it may concern:*

Be it known that I, HUGH LESLEY, a citizen of the United States, residing at Philadelphia, in the county of Philadelphia and State of Pennsylvania, have invented a certain new and useful Discharge Indicator for Storage Batteries, of which the following is a specification.

The principal object of the present invention is to provide a discharge indicator in the form of a specially designed hydrometer which can be used to readily ascertain when the storage battery needs recharging even by those unskilled in the art and ignorant of hydrometers and of their mode of operation.

The invention will be claimed at the end hereof but will be first described in connection with the embodiment of it chosen from other embodiments for the sake of illustration in the accompanying drawing forming part hereof and in which there is illustrated upon an enlarged scale a side view of a discharge indicator.

In the drawings 1, is a hydrometer provided upon or within the stem with two contrasting or demarked zones 2 and 3, of duplicate sets of zone graduations $a$ and $b$, and $a'$ and $b'$. The number of graduations shown may be increased or diminished. The zone 2, may be red, and the zone 3, may be white, and the rest of the stem may be black as at 4, and this is one way of demarking or contrasting the zones.

The mode of operation is as follows:

The indicator is placed in the electrolyte, either in the battery or in a well understood syringe containing some of the electrolyte, and when the battery under charge is gassing freely or is otherwise known to be fully charged, the liquid level on the zone 3, is noted, for example at $b'$, then the graduation $b$, in the zone 2, indicates, when at the liquid level, that the cell or battery is discharged, so that thereafter all that the operator has to do is to use the indicator and when the liquid level is at $b$, in zone 2, the operator knows that the cell is discharged. The function of the zone 3, of graduations is to establish in the zone 2, a graduation which shows the point at which the battery is discharged and should therefore be re-charged.

I claim:

1. A discharge indicator for storage batteries comprising a hydrometer provided with two contrasting zones, one covering the range in specific gravity at complete charge and the other covering the range in specific gravity at the limit of discharge in relation to specific gravity at completion of charge and each consisting of duplicate sets of graduations of which one set affords means for selecting in the other set a graduation indicating the allowable or desired limit of discharge.

2. A discharge indicator for storage batteries comprising a hydrometer provided with two contrasting zones, one covering the range in specific gravity at complete charge and the other covering the range in specific gravity at the limit of discharge in relation to specific gravity at completion of charge whereby one affords means for selecting in the other the indication of the allowable or desired limit of discharge.

HUGH LESLEY.